US007520729B2

(12) United States Patent
McGowan et al.

(10) Patent No.: US 7,520,729 B2
(45) Date of Patent: Apr. 21, 2009

(54) AIRFOIL SHAPE FOR A COMPRESSOR

(75) Inventors: Christopher McGowan, Greer, SC (US); Paul DeIvernois, Greer, SC (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 11/586,049

(22) Filed: Oct. 25, 2006

(65) Prior Publication Data

US 2008/0101942 A1 May 1, 2008

(51) Int. Cl.
*B64C 27/46* (2006.01)

(52) U.S. Cl. .............................. 416/223 R; 416/DIG. 5

(58) Field of Classification Search ................. 415/191, 415/208.1, 208.2; 416/223 R, 223 A, DIG. 2, 416/DIG. 5
See application file for complete search history.

(56) References Cited

U.S. PATENT DOCUMENTS

2006/0073014 A1* 4/2006 Tomberg et al. .......... 416/96 R
2007/0048143 A1* 3/2007 Noshi ...................... 416/223 R
2007/0177980 A1* 8/2007 Keener et al. ........... 416/223 R
2007/0177981 A1* 8/2007 Vandeputte et al. ..... 416/223 R
2007/0201983 A1* 8/2007 Arinci et al. ............ 416/223 R
2007/0231147 A1* 10/2007 Tomberg et al. ........ 416/223 R
2008/0044288 A1* 2/2008 Novori et al. ........... 416/223 R
2008/0101940 A1* 5/2008 LaMaster et al. ........ 416/223 R
2008/0101941 A1* 5/2008 LaMaster et al. ........ 416/223 R
2008/0101943 A1* 5/2008 Columbus et al. ....... 416/223 R
2008/0101944 A1* 5/2008 Spracher et al. ......... 416/223 R
2008/0101945 A1* 5/2008 Tomberg et al. ........ 416/223 R
2008/0101946 A1* 5/2008 Duong et al. ........... 416/223 R
2008/0101947 A1* 5/2008 Shrum et al. ............ 416/223 R
2008/0101948 A1* 5/2008 Latimer et al. .......... 416/223 R
2008/0101949 A1* 5/2008 Spracher et al. ......... 416/223 R
2008/0101950 A1* 5/2008 Noshi et al. ............. 416/223 R
2008/0101951 A1* 5/2008 Hudson et al. .......... 416/223 R
2008/0101952 A1* 5/2008 Duong et al. ........... 416/223 R
2008/0101953 A1* 5/2008 Huskins et al. ......... 416/223 R
2008/0101954 A1* 5/2008 Latimer et al. .......... 416/223 R
2008/0101955 A1* 5/2008 McGowan et al. ...... 416/223 R
2008/0101956 A1* 5/2008 Douchkin et al. ....... 416/223 R
2008/0101957 A1* 5/2008 Columbus et al. ....... 416/223 R
2008/0101958 A1* 5/2008 Latimer et al. .......... 416/223 R
2008/0107534 A1* 5/2008 Cheruku et al. ......... 416/223 A
2008/0107535 A1* 5/2008 Radhakrishnan et al. 416/223 A
2008/0107536 A1* 5/2008 Devangada et al. ..... 416/223 A
2008/0107537 A1* 5/2008 Devangada et al. ..... 416/223 A

* cited by examiner

*Primary Examiner*—Igor Kershteyn
(74) *Attorney, Agent, or Firm*—Ernest G. Cusick; Frank A. Landgraf

(57) ABSTRACT

An article of manufacture having a nominal profile substantially in accordance with Cartesian coordinate values of X, Y and Z set forth in a TABLE 1. Wherein X and Y are distances in inches which, when connected by smooth continuing arcs, define airfoil profile sections at each distance Z in inches. The profile sections at the Z distances being joined smoothly with one another to form a complete airfoil shape.

9 Claims, 4 Drawing Sheets

AIRFOIL SHAPE FOR A COMPRESSOR

BACKGROUND OF THE INVENTION

The present invention is related to the following GE dockets: 219737, 219768, filed on Oct. 25, 2006, Nov. 02, 2006, respectively.

The present invention relates to airfoils for a rotor blade of a gas turbine. In particular, the invention relates to compressor airfoil profiles for various stages of the compressor. In particular, the invention relates to compressor airfoil profiles for either inlet guide vanes, rotors, or stators at various stages of the compressor.

In a gas turbine, many system requirements should be met at each stage of a gas turbine's flow path section to meet design goals. These design goals include, but are not limited to, overall improved efficiency and airfoil loading capability. For example, and in no way limiting of the invention, a blade of a compressor stator should achieve thermal and mechanical operating requirements for that particular stage. Further, for example, and in no way limiting of the invention, a blade of a compressor rotor should achieve thermal and mechanical operating requirements for that particular stage.

BRIEF DESCRIPTION OF THE INVENTION

In accordance with one exemplary aspect of the instant invention, an article of manufacture having a nominal profile substantially in accordance with Cartesian coordinate values of X, Y and Z set forth in TABLE 1. Wherein X and Y are distances in inches which, when connected by smooth continuing arcs, define airfoil profile sections at each distance Z in inches. The profile sections at the Z distances being joined smoothly with one another to form a complete airfoil shape.

In accordance with another exemplary aspect of the instant invention, a compressor comprises a compressor wheel. The compressor wheel has a plurality of articles of manufacture. Each of the articles of manufacture includes an airfoil having an airfoil shape. The airfoil comprises a nominal profile substantially in accordance with Cartesian coordinate values of X, Y and Z set forth in TABLE 1, wherein X and Y are distances in inches which, when connected by smooth continuing arcs, define airfoil profile sections at each distance Z in inches. The profile sections at the Z distances being joined smoothly with one another to form a complete airfoil shape.

In accordance with yet exemplary another aspect of the instant invention, a compressor comprises a compressor wheel having a plurality of articles of manufacture. Each of the articles of manufacture includes an airfoil having an uncoated nominal airfoil profile substantially in accordance with Cartesian coordinate values of X, Y and Z set forth in TABLE 1, wherein X and Y are distances in inches which, when connected by smooth continuing arcs, define airfoil profile sections at each distance Z in inches. The profile sections at the Z distances being joined smoothly with one another to form a complete airfoil shape.

DETAILED DESCRIPTION OF THE INVENTION

Figure 1:
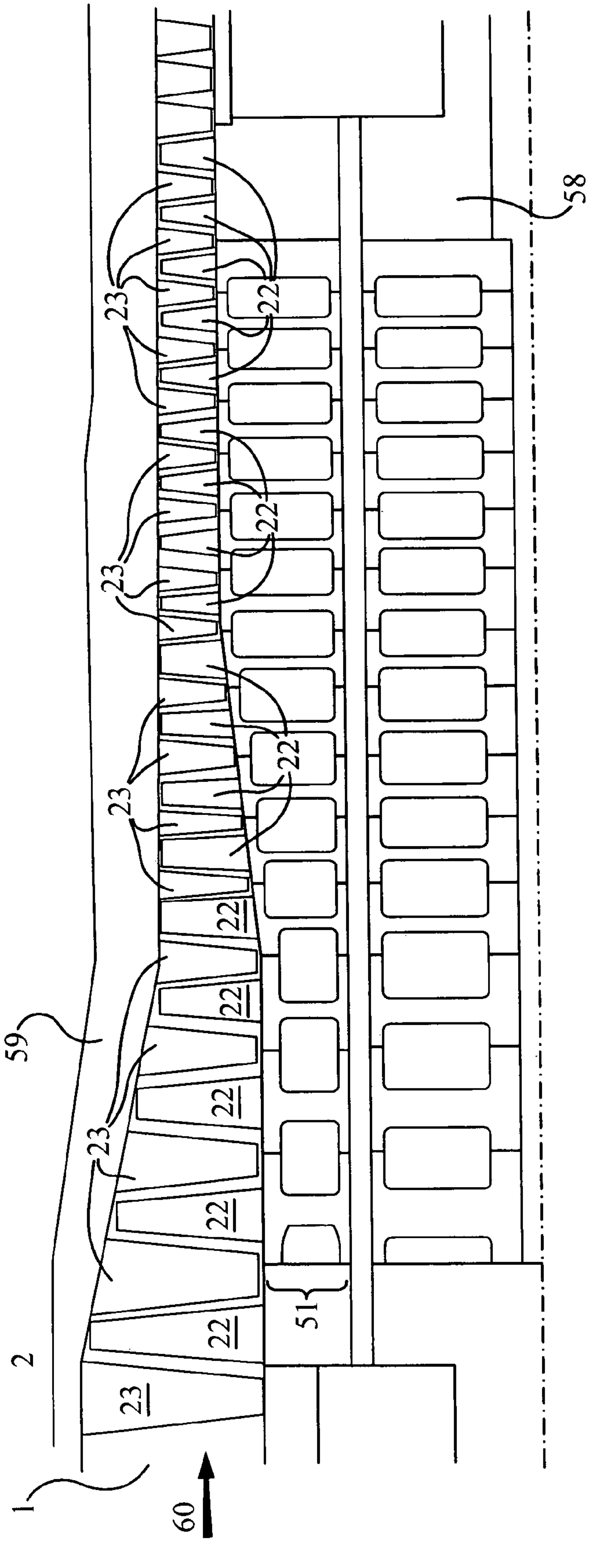
FIG. 1 is a schematic exemplary representation of a compressor flow path through multiple stages of a gas turbine and illustrates an exemplary airfoil according to an embodiment of the invention.
Figure 4:
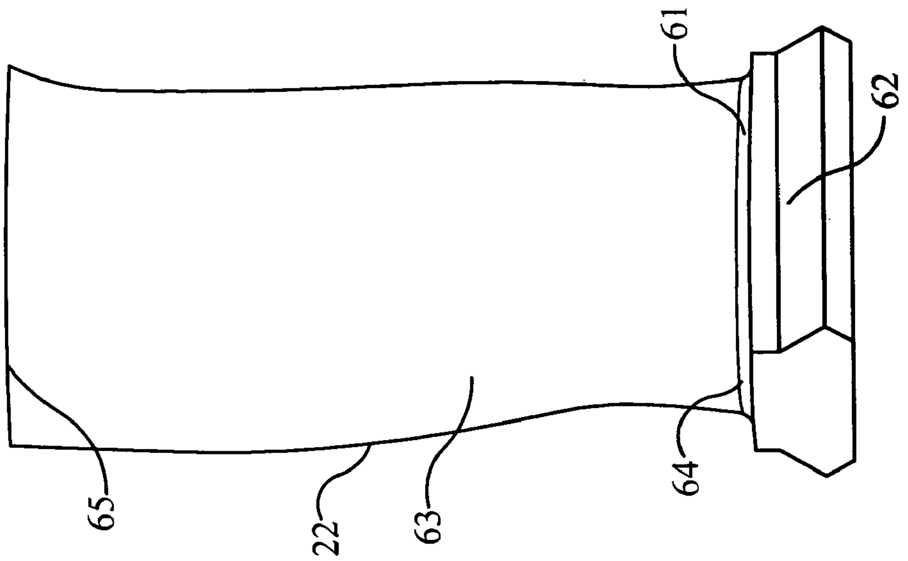
FIGS. 4 and 5 are side elevational views of the rotor blade of FIG. 2 and associated platform and dovetail connection as viewed in a generally circumferential direction from the pressure and suction sides of the airfoil, respectively.
Figure 3:
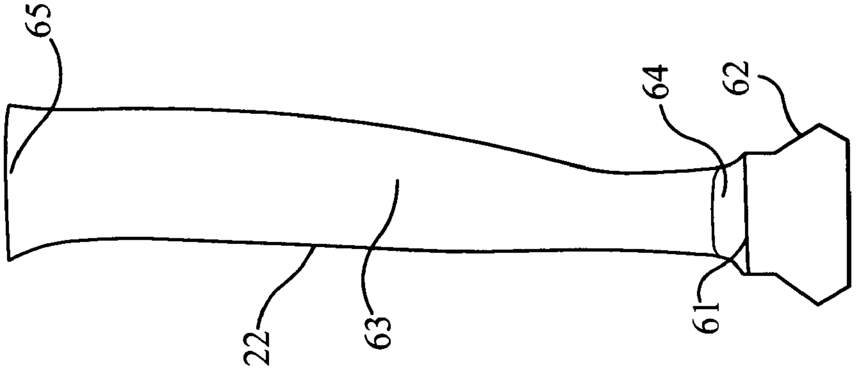
FIGS. 2 and 3 are respective perspective exemplary views of a rotor blade according to an embodiment of the invention with the rotor blade airfoil illustrated in conjunction with its platform and its substantially or near axial entry dovetail connection.
Figure 2:
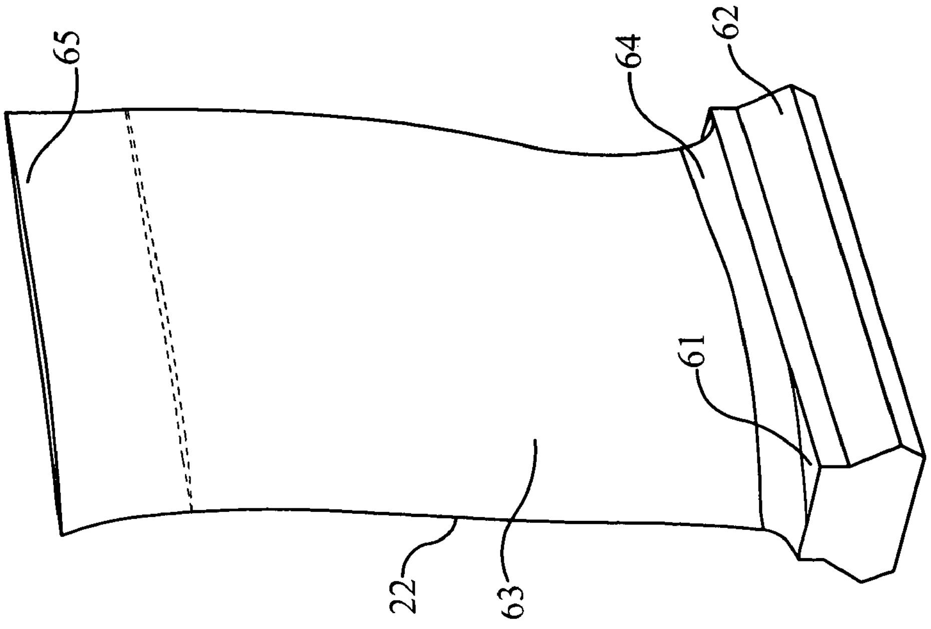

Referring now to the drawings, FIG. 1 illustrates an axial compressor flow path 1 of a gas turbine compressor 2 that includes a plurality of compressor stages. The compressor stages are sequentially numbered in the Figure. The compressor flow path comprises any number of rotor stages and stator stages, such as eighteen. However, the exact number of rotor and stator stages is a choice of engineering design. Any number of rotor and stator stages can be provided in the combustor, as embodied by the invention. The eighteen rotor stages are merely exemplary of one turbine design. The eighteen rotor stages are not intended to limit the invention in any manner.

The compressor rotor blades impart kinetic energy to the airflow and therefore bring about a desired pressure rise across the compressor. Directly following the rotor airfoils is a stage of stator airfoils. Both the rotor and stator airfoils turn the airflow, slow the airflow velocity (in the respective airfoil frame of reference), and yield a rise in the static pressure of the airflow. The configuration of the airfoil (along with its interaction with surrounding airfoils), including its peripheral surface provides for stage airflow efficiency, enhanced aeromechanics, smooth laminar flow from stage to stage, reduced thermal stresses, enhanced interrelation of the stages to effectively pass the airflow from stage to stage, and reduced mechanical stresses, among other desirable aspects of the invention. Typically, multiple rows of rotor/stator stages are stacked in axial flow compressors to achieve a desired discharge to inlet pressure ratio. Rotor and stator airfoils can be secured to rotor wheels or stator case by an appropriate attachment configuration, often known as a "root", "base" or "dovetail" (see FIGS. 2-5).

A stage of the compressor 2 is exemplarily illustrated in FIG. 1. The stage of the compressor 2 comprises a plurality of circumferentially spaced rotor blades 22 mounted on a rotor wheel 51 and a plurality of circumferentially spaced stator blades 23 attached to a static compressor case 59. Each of the rotor wheels is attached to aft drive shaft 58, which is connected to the turbine section of the engine. The rotor blades and stator blades lie in the flow path 1 of the compressor. The direction of airflow through the compressor flow path 1, as embodied by the invention, is indicated by the arrow 60 (FIG. 1). This stage of the compressor 2 is merely exemplarily of the stages of the compressor 2 within the scope of the invention. The illustrated and described stage of the compressor 2 is not intended to limit the invention in any manner.

Figure 6:
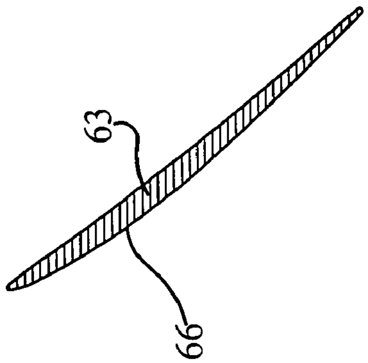
FIG. 6 is a cross-sectional view of the rotor blade airfoil taken generally about on line 6-6 in FIG. 5.

The rotor blades 22 are mounted on the rotor wheel 51 forming part of aft drive shaft 58. Each rotor blade 22, as illustrated in FIGS. 2-6, is provided with a platform 61, and substantially or near axial entry dovetail 62 for connection with a complementary-shaped mating dovetail, not shown, on the rotor wheel 51. An axial entry dovetail, however, may be provided with the airfoil profile, as embodied by the invention. Each rotor blade 22 comprises a rotor blade airfoil 63, as illustrated in FIGS. 2-6. Thus, each of the rotor blades 22 has a rotor blade airfoil profile 66 at any cross-section from the airfoil root 64 at a midpoint of platform 61 to the rotor blade tip 65 in the general shape of an airfoil (FIG. 6).

To define the airfoil shape of the rotor blade airfoil, a unique set or loci of points in space are provided. This unique set or loci of points meet the stage requirements so the stage can be manufactured. This unique loci of points also meets the desired requirements for stage efficiency and reduced thermal and mechanical stresses. The loci of points are arrived at by iteration between aerodynamic and mechanical loadings enabling the compressor to run in an efficient, safe and smooth manner.

The loci, as embodied by the invention, defines the rotor blade airfoil profile and can comprise a set of points relative to the axis of rotation of the engine. For example, a set of points can be provided to define a rotor blade airfoil profile.

Figure 8:
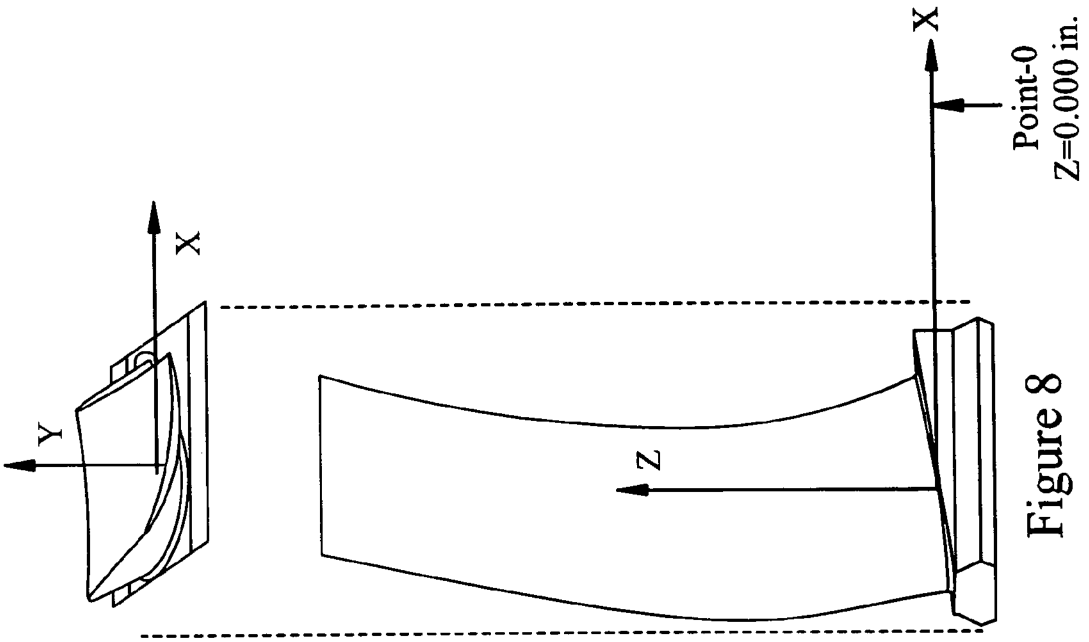
FIG. 8 is a perspective view of a stator blade according to an exemplary embodiment of the invention with coordinate system superimposed thereon.
Figure 7:
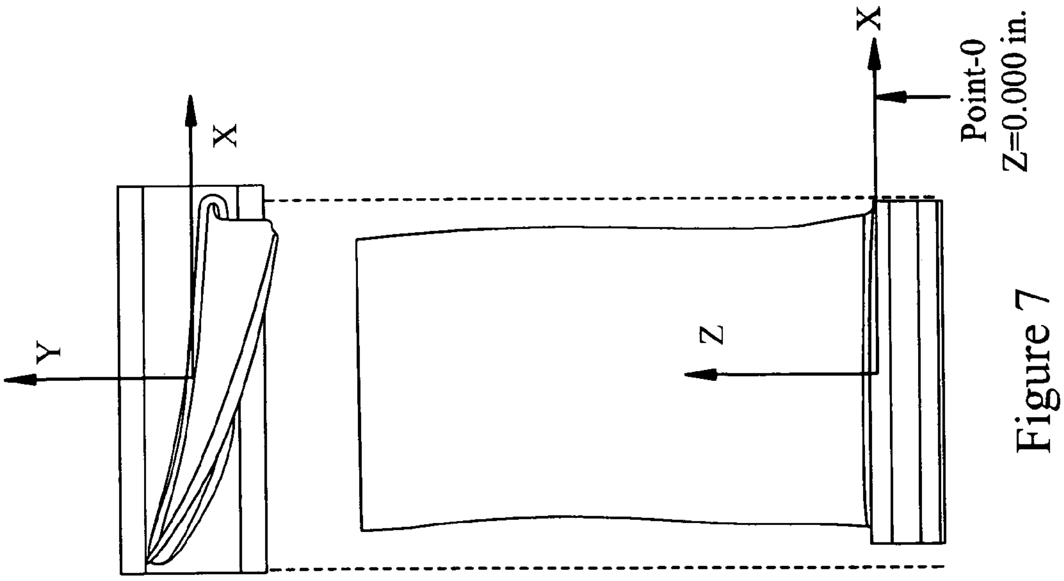
FIG. 7 is a perspective views of a rotor blade according to an exemplary embodiment of the invention with coordinate system superimposed thereon.

A Cartesian coordinate system of X, Y and Z values given in the Table below defines a profile of a rotor blade airfoil at various locations along its length. The airfoil, as embodied by the invention, could find an application as a stage one airfoil rotor blade. The coordinate values for the X, Y and Z coordinates are set forth in inches, although other units of dimensions may be used when the values are appropriately converted. These values exclude fillet regions of the platform. The Cartesian coordinate system has orthogonally-related X, Y and Z axes. The X axis lies parallel to the compressor blade's dovetail axis, which is at a angle to the engine's centerline, as illustrated in FIG. 7 for a rotor and FIG. 8 for a stator. A positive X coordinate value is axial toward the aft, for example the exhaust end of the compressor. A positive Y coordinate value directed normal to the dovetail axis. A positive Z coordinate value is directed radially outward toward tip of the airfoil, which is towards the static casing of the compressor for rotor blades, and directed radially inward towards the engine centerline of the compressor for stator blades.

Figure 5:
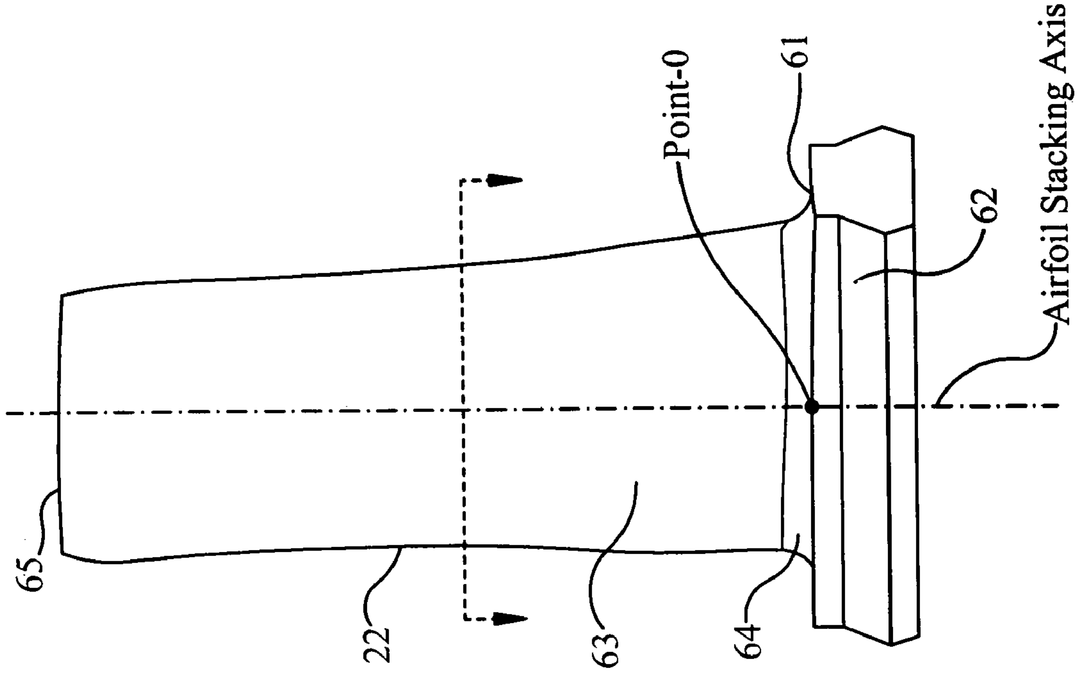

For reference purposes only, there is established point-0 passing through the intersection of the airfoil and the platform along the stacking axis, as illustrated in FIG. 5. In the exemplary embodiment of the airfoil hereof, the point-0 is defined as the reference section where the Z coordinate of the table above is at 0.000 inches, which is a set predetermined distance from the engine or rotor centerline.

By defining X and Y coordinate values at selected locations in a Z direction normal to the X, Y plane, the profile section of the rotor blade airfoil, such as, but not limited to the profile section 66 in FIG. 6, at each Z distance along the length of the airfoil can be ascertained. By connecting the X and Y values with smooth continuing arcs, each profile section 66 at each distance Z can be fixed. The airfoil profiles of the various surface locations between the distances Z are determined by smoothly connecting the adjacent profile sections 66 to one another, thus forming the airfoil profile. These values represent the airfoil profiles at ambient, non-operating or non-hot conditions and are for an uncoated airfoil.

The table values are generated and shown to three decimal places for determining the profile of the airfoil. There are typical manufacturing tolerances as well as coatings, which should be accounted for in the actual profile of the airfoil. Accordingly, the values for the profile given are for a nominal airfoil. It will therefore be appreciated that +/−typical manufacturing tolerances, such as, +/−values, including any coating thicknesses, are additive to the X and Y values. Therefore, a distance of about +/−0.160 inches in a direction normal to any surface location along the airfoil profile defines an airfoil profile envelope for a rotor blade airfoil design and compressor. In other words, a distance of about +/−0.160 inches in a direction normal to any surface location along the airfoil profile defines a range of variation between measured points on the actual airfoil surface at nominal cold or room temperature and the ideal position of those points, at the same temperature, as embodied by the invention. The rotor blade airfoil design, as embodied by the invention, is robust to this range of variation without impairment of mechanical and aerodynamic functions.

The coordinate values given in TABLE 1 below provides the nominal profile envelope for an exemplary airfoil, such as but not limited to, a stage one airfoil rotor blade.

TABLE 1

| X-LOC | Y-LOC | Z-LOC |
|---|---|---|
| 6.44 | 1.18 | 0.338 |
| 6.448 | 1.157 | 0.338 |
| 6.454 | 1.125 | 0.338 |
| 6.453 | 1.085 | 0.338 |
| 6.44 | 1.038 | 0.338 |
| 6.405 | 0.983 | 0.338 |
| 6.335 | 0.935 | 0.338 |
| 6.239 | 0.888 | 0.338 |
| 6.122 | 0.832 | 0.338 |
| 5.983 | 0.766 | 0.338 |
| 5.82 | 0.689 | 0.338 |
| 5.626 | 0.6 | 0.338 |
| 5.402 | 0.499 | 0.338 |
| 5.147 | 0.386 | 0.338 |
| 4.861 | 0.264 | 0.338 |
| 4.543 | 0.132 | 0.338 |
| 4.193 | −0.007 | 0.338 |
| 3.826 | −0.146 | 0.338 |
| 3.441 | −0.285 | 0.338 |
| 3.039 | −0.422 | 0.338 |
| 2.618 | −0.556 | 0.338 |
| 2.178 | −0.685 | 0.338 |
| 1.718 | −0.808 | 0.338 |
| 1.24 | −0.922 | 0.338 |
| 0.76 | −1.02 | 0.338 |
| 0.278 | −1.104 | 0.338 |
| −0.206 | −1.17 | 0.338 |
| −0.692 | −1.219 | 0.338 |
| −1.18 | −1.25 | 0.338 |
| −1.671 | −1.26 | 0.338 |
| −2.164 | −1.251 | 0.338 |
| −2.654 | −1.22 | 0.338 |
| −3.139 | −1.165 | 0.338 |
| −3.619 | −1.085 | 0.338 |
| −4.093 | −0.979 | 0.338 |
| −4.546 | −0.853 | 0.338 |
| −4.979 | −0.711 | 0.338 |
| −5.392 | −0.553 | 0.338 |
| −5.786 | −0.386 | 0.338 |
| −6.159 | −0.213 | 0.338 |
| −6.512 | −0.037 | 0.338 |
| −6.846 | 0.141 | 0.338 |
| −7.161 | 0.318 | 0.338 |
| −7.445 | 0.485 | 0.338 |
| −7.697 | 0.641 | 0.338 |
| −7.916 | 0.786 | 0.338 |
| −8.117 | 0.93 | 0.338 |
| −8.285 | 1.062 | 0.338 |
| −8.408 | 1.171 | 0.338 |
| −8.501 | 1.265 | 0.338 |
| −8.563 | 1.342 | 0.338 |
| −8.6 | 1.406 | 0.338 |
| −8.613 | 1.445 | 0.338 |
| −8.614 | 1.471 | 0.338 |
| −8.612 | 1.484 | 0.338 |
| −8.609 | 1.49 | 0.338 |
| −8.608 | 1.493 | 0.338 |
| −8.606 | 1.496 | 0.338 |
| −8.602 | 1.501 | 0.338 |
| −8.594 | 1.51 | 0.338 |
| −8.573 | 1.523 | 0.338 |
| −8.535 | 1.534 | 0.338 |

TABLE 1-continued

| X-LOC | Y-LOC | Z-LOC |
|---|---|---|
| −8.466 | 1.539 | 0.338 |
| −8.373 | 1.532 | 0.338 |
| −8.251 | 1.511 | 0.338 |
| −8.101 | 1.476 | 0.338 |
| −7.907 | 1.423 | 0.338 |
| −7.686 | 1.355 | 0.338 |
| −7.451 | 1.279 | 0.338 |
| −7.187 | 1.191 | 0.338 |
| −6.894 | 1.094 | 0.338 |
| −6.571 | 0.992 | 0.338 |
| −6.231 | 0.889 | 0.338 |
| −5.875 | 0.789 | 0.338 |
| −5.502 | 0.692 | 0.338 |
| −5.113 | 0.597 | 0.338 |
| −4.706 | 0.507 | 0.338 |
| −4.282 | 0.423 | 0.338 |
| −3.841 | 0.346 | 0.338 |
| −3.383 | 0.276 | 0.338 |
| −2.926 | 0.218 | 0.338 |
| −2.469 | 0.171 | 0.338 |
| −2.011 | 0.136 | 0.338 |
| −1.553 | 0.117 | 0.338 |
| −1.095 | 0.111 | 0.338 |
| −0.637 | 0.119 | 0.338 |
| −0.179 | 0.139 | 0.338 |
| 0.28 | 0.17 | 0.338 |
| 0.738 | 0.211 | 0.338 |
| 1.197 | 0.261 | 0.338 |
| 1.656 | 0.32 | 0.338 |
| 2.098 | 0.385 | 0.338 |
| 2.525 | 0.454 | 0.338 |
| 2.935 | 0.525 | 0.338 |
| 3.329 | 0.599 | 0.338 |
| 3.707 | 0.675 | 0.338 |
| 4.07 | 0.752 | 0.338 |
| 4.416 | 0.829 | 0.338 |
| 4.732 | 0.903 | 0.338 |
| 5.016 | 0.972 | 0.338 |
| 5.271 | 1.037 | 0.338 |
| 5.495 | 1.095 | 0.338 |
| 5.689 | 1.147 | 0.338 |
| 5.852 | 1.192 | 0.338 |
| 5.992 | 1.231 | 0.338 |
| 6.109 | 1.264 | 0.338 |
| 6.206 | 1.292 | 0.338 |
| 6.285 | 1.299 | 0.338 |
| 6.345 | 1.282 | 0.338 |
| 6.385 | 1.256 | 0.338 |
| 6.413 | 1.228 | 0.338 |
| 6.43 | 1.202 | 0.338 |
| 6.539 | 1.063 | 2.739 |
| 6.544 | 1.039 | 2.739 |
| 6.545 | 1.007 | 2.739 |
| 6.537 | 0.967 | 2.739 |
| 6.514 | 0.924 | 2.739 |
| 6.465 | 0.882 | 2.739 |
| 6.386 | 0.848 | 2.739 |
| 6.288 | 0.807 | 2.739 |
| 6.168 | 0.757 | 2.739 |
| 6.025 | 0.699 | 2.739 |
| 5.857 | 0.631 | 2.739 |
| 5.659 | 0.553 | 2.739 |
| 5.429 | 0.463 | 2.739 |
| 5.168 | 0.364 | 2.739 |
| 4.876 | 0.255 | 2.739 |
| 4.552 | 0.138 | 2.739 |
| 4.196 | 0.014 | 2.739 |
| 3.823 | −0.111 | 2.739 |
| 3.432 | −0.236 | 2.739 |
| 3.023 | −0.358 | 2.739 |
| 2.596 | −0.477 | 2.739 |
| 2.15 | −0.59 | 2.739 |
| 1.688 | −0.696 | 2.739 |
| 1.208 | −0.792 | 2.739 |
| 0.728 | −0.873 | 2.739 |
| 0.246 | −0.938 | 2.739 |
| −0.238 | −0.987 | 2.739 |

TABLE 1-continued

| X-LOC | Y-LOC | Z-LOC |
|---|---|---|
| −0.723 | −1.019 | 2.739 |
| −1.209 | −1.032 | 2.739 |
| −1.697 | −1.025 | 2.739 |
| −2.187 | −0.998 | 2.739 |
| −2.679 | −0.951 | 2.739 |
| −3.169 | −0.881 | 2.739 |
| −3.655 | −0.789 | 2.739 |
| −4.135 | −0.674 | 2.739 |
| −4.594 | −0.542 | 2.739 |
| −5.033 | −0.396 | 2.739 |
| −5.45 | −0.238 | 2.739 |
| −5.846 | −0.073 | 2.739 |
| −6.223 | 0.095 | 2.739 |
| −6.58 | 0.266 | 2.739 |
| −6.919 | 0.438 | 2.739 |
| −7.24 | 0.608 | 2.739 |
| −7.529 | 0.768 | 2.739 |
| −7.786 | 0.918 | 2.739 |
| −8.01 | 1.059 | 2.739 |
| −8.216 | 1.197 | 2.739 |
| −8.388 | 1.325 | 2.739 |
| −8.515 | 1.431 | 2.739 |
| −8.611 | 1.523 | 2.739 |
| −8.675 | 1.598 | 2.739 |
| −8.715 | 1.661 | 2.739 |
| −8.728 | 1.7 | 2.739 |
| −8.73 | 1.726 | 2.739 |
| −8.728 | 1.739 | 2.739 |
| −8.726 | 1.746 | 2.739 |
| −8.724 | 1.749 | 2.739 |
| −8.723 | 1.751 | 2.739 |
| −8.719 | 1.757 | 2.739 |
| −8.711 | 1.766 | 2.739 |
| −8.689 | 1.779 | 2.739 |
| −8.652 | 1.791 | 2.739 |
| −8.581 | 1.796 | 2.739 |
| −8.488 | 1.79 | 2.739 |
| −8.364 | 1.772 | 2.739 |
| −8.212 | 1.74 | 2.739 |
| −8.016 | 1.69 | 2.739 |
| −7.791 | 1.627 | 2.739 |
| −7.552 | 1.556 | 2.739 |
| −7.284 | 1.473 | 2.739 |
| −6.986 | 1.383 | 2.739 |
| −6.657 | 1.286 | 2.739 |
| −6.313 | 1.189 | 2.739 |
| −5.952 | 1.092 | 2.739 |
| −5.574 | 0.996 | 2.739 |
| −5.18 | 0.901 | 2.739 |
| −4.77 | 0.809 | 2.739 |
| −4.342 | 0.722 | 2.739 |
| −3.899 | 0.639 | 2.739 |
| −3.438 | 0.561 | 2.739 |
| −2.977 | 0.491 | 2.739 |
| −2.514 | 0.43 | 2.739 |
| −2.049 | 0.38 | 2.739 |
| −1.583 | 0.343 | 2.739 |
| −1.117 | 0.32 | 2.739 |
| −0.652 | 0.311 | 2.739 |
| −0.188 | 0.314 | 2.739 |
| 0.277 | 0.327 | 2.739 |
| 0.741 | 0.351 | 2.739 |
| 1.205 | 0.384 | 2.739 |
| 1.669 | 0.425 | 2.739 |
| 2.117 | 0.471 | 2.739 |
| 2.55 | 0.522 | 2.739 |
| 2.966 | 0.576 | 2.739 |
| 3.366 | 0.633 | 2.739 |
| 3.75 | 0.691 | 2.739 |
| 4.119 | 0.75 | 2.739 |
| 4.472 | 0.809 | 2.739 |
| 4.793 | 0.865 | 2.739 |
| 5.084 | 0.917 | 2.739 |
| 5.344 | 0.965 | 2.739 |
| 5.573 | 1.008 | 2.739 |
| 5.772 | 1.047 | 2.739 |
| 5.939 | 1.081 | 2.739 |

TABLE 1-continued

| X-LOC | Y-LOC | Z-LOC |
|---|---|---|
| 6.083 | 1.11 | 2.739 |
| 6.203 | 1.135 | 2.739 |
| 6.302 | 1.155 | 2.739 |
| 6.381 | 1.171 | 2.739 |
| 6.443 | 1.163 | 2.739 |
| 6.485 | 1.14 | 2.739 |
| 6.513 | 1.112 | 2.739 |
| 6.53 | 1.085 | 2.739 |
| 6.565 | 0.277 | 5.139 |
| 6.567 | 0.253 | 5.139 |
| 6.564 | 0.221 | 5.139 |
| 6.549 | 0.183 | 5.139 |
| 6.519 | 0.146 | 5.139 |
| 6.461 | 0.117 | 5.139 |
| 6.38 | 0.095 | 5.139 |
| 6.278 | 0.068 | 5.139 |
| 6.154 | 0.035 | 5.139 |
| 6.006 | −0.004 | 5.139 |
| 5.833 | −0.049 | 5.139 |
| 5.628 | −0.102 | 5.139 |
| 5.392 | −0.161 | 5.139 |
| 5.124 | −0.226 | 5.139 |
| 4.823 | −0.297 | 5.139 |
| 4.491 | −0.372 | 5.139 |
| 4.125 | −0.45 | 5.139 |
| 3.743 | −0.527 | 5.139 |
| 3.344 | −0.602 | 5.139 |
| 2.928 | −0.673 | 5.139 |
| 2.494 | −0.739 | 5.139 |
| 2.044 | −0.798 | 5.139 |
| 1.579 | −0.85 | 5.139 |
| 1.097 | −0.892 | 5.139 |
| 0.615 | −0.922 | 5.139 |
| 0.133 | −0.939 | 5.139 |
| −0.349 | −0.941 | 5.139 |
| −0.831 | −0.928 | 5.139 |
| −1.313 | −0.899 | 5.139 |
| −1.795 | −0.854 | 5.139 |
| −2.277 | −0.792 | 5.139 |
| −2.759 | −0.713 | 5.139 |
| −3.239 | −0.614 | 5.139 |
| −3.713 | −0.497 | 5.139 |
| −4.182 | −0.359 | 5.139 |
| −4.629 | −0.21 | 5.139 |
| −5.056 | −0.051 | 5.139 |
| −5.464 | 0.116 | 5.139 |
| −5.853 | 0.287 | 5.139 |
| −6.224 | 0.459 | 5.139 |
| −6.576 | 0.632 | 5.139 |
| −6.911 | 0.804 | 5.139 |
| −7.228 | 0.973 | 5.139 |
| −7.513 | 1.133 | 5.139 |
| −7.767 | 1.282 | 5.139 |
| −7.988 | 1.422 | 5.139 |
| −8.191 | 1.559 | 5.139 |
| −8.362 | 1.686 | 5.139 |
| −8.487 | 1.791 | 5.139 |
| −8.582 | 1.881 | 5.139 |
| −8.646 | 1.955 | 5.139 |
| −8.686 | 2.017 | 5.139 |
| −8.7 | 2.055 | 5.139 |
| −8.702 | 2.081 | 5.139 |
| −8.7 | 2.094 | 5.139 |
| −8.698 | 2.1 | 5.139 |
| −8.696 | 2.103 | 5.139 |
| −8.695 | 2.106 | 5.139 |
| −8.691 | 2.111 | 5.139 |
| −8.682 | 2.12 | 5.139 |
| −8.659 | 2.131 | 5.139 |
| −8.621 | 2.139 | 5.139 |
| −8.551 | 2.14 | 5.139 |
| −8.458 | 2.129 | 5.139 |
| −8.335 | 2.106 | 5.139 |
| −8.185 | 2.069 | 5.139 |
| −7.99 | 2.014 | 5.139 |
| −7.767 | 1.946 | 5.139 |
| −7.529 | 1.871 | 5.139 |

TABLE 1-continued

| X-LOC | Y-LOC | Z-LOC |
|---|---|---|
| −7.263 | 1.785 | 5.139 |
| −6.966 | 1.691 | 5.139 |
| −6.638 | 1.591 | 5.139 |
| −6.295 | 1.49 | 5.139 |
| −5.936 | 1.387 | 5.139 |
| −5.56 | 1.284 | 5.139 |
| −5.169 | 1.18 | 5.139 |
| −4.763 | 1.076 | 5.139 |
| −4.339 | 0.974 | 5.139 |
| −3.9 | 0.874 | 5.139 |
| −3.444 | 0.776 | 5.139 |
| −2.987 | 0.685 | 5.139 |
| −2.529 | 0.599 | 5.139 |
| −2.069 | 0.52 | 5.139 |
| −1.607 | 0.451 | 5.139 |
| −1.144 | 0.391 | 5.139 |
| −0.679 | 0.341 | 5.139 |
| −0.215 | 0.301 | 5.139 |
| 0.251 | 0.27 | 5.139 |
| 0.716 | 0.247 | 5.139 |
| 1.182 | 0.232 | 5.139 |
| 1.649 | 0.222 | 5.139 |
| 2.1 | 0.218 | 5.139 |
| 2.535 | 0.218 | 5.139 |
| 2.956 | 0.223 | 5.139 |
| 3.36 | 0.231 | 5.139 |
| 3.749 | 0.242 | 5.139 |
| 4.123 | 0.256 | 5.139 |
| 4.48 | 0.271 | 5.139 |
| 4.807 | 0.287 | 5.139 |
| 5.102 | 0.303 | 5.139 |
| 5.366 | 0.319 | 5.139 |
| 5.599 | 0.334 | 5.139 |
| 5.801 | 0.348 | 5.139 |
| 5.972 | 0.36 | 5.139 |
| 6.118 | 0.37 | 5.139 |
| 6.24 | 0.379 | 5.139 |
| 6.341 | 0.387 | 5.139 |
| 6.422 | 0.393 | 5.139 |
| 6.483 | 0.382 | 5.139 |
| 6.521 | 0.357 | 5.139 |
| 6.546 | 0.327 | 5.139 |
| 6.559 | 0.3 | 5.139 |
| 6.476 | −0.616 | 7.539 |
| 6.475 | −0.64 | 7.539 |
| 6.466 | −0.67 | 7.539 |
| 6.445 | −0.704 | 7.539 |
| 6.407 | −0.732 | 7.539 |
| 6.344 | −0.744 | 7.539 |
| 6.261 | −0.753 | 7.539 |
| 6.158 | −0.765 | 7.539 |
| 6.032 | −0.779 | 7.539 |
| 5.882 | −0.795 | 7.539 |
| 5.707 | −0.813 | 7.539 |
| 5.499 | −0.834 | 7.539 |
| 5.26 | −0.858 | 7.539 |
| 4.989 | −0.883 | 7.539 |
| 4.686 | −0.91 | 7.539 |
| 4.35 | −0.936 | 7.539 |
| 3.983 | −0.962 | 7.539 |
| 3.599 | −0.985 | 7.539 |
| 3.198 | −1.004 | 7.539 |
| 2.783 | −1.017 | 7.539 |
| 2.351 | −1.024 | 7.539 |
| 1.905 | −1.024 | 7.539 |
| 1.445 | −1.015 | 7.539 |
| 0.969 | −0.996 | 7.539 |
| 0.495 | −0.966 | 7.539 |
| 0.022 | −0.926 | 7.539 |
| −0.449 | −0.875 | 7.539 |
| −0.919 | −0.812 | 7.539 |
| −1.387 | −0.739 | 7.539 |
| −1.854 | −0.654 | 7.539 |
| −2.319 | −0.557 | 7.539 |
| −2.783 | −0.448 | 7.539 |
| −3.245 | −0.324 | 7.539 |
| −3.705 | −0.186 | 7.539 |

TABLE 1-continued

| X-LOC | Y-LOC | Z-LOC |
|---|---|---|
| −4.163 | −0.032 | 7.539 |
| −4.602 | 0.13 | 7.539 |
| −5.022 | 0.297 | 7.539 |
| −5.422 | 0.47 | 7.539 |
| −5.803 | 0.645 | 7.539 |
| −6.167 | 0.819 | 7.539 |
| −6.513 | 0.993 | 7.539 |
| −6.842 | 1.166 | 7.539 |
| −7.154 | 1.335 | 7.539 |
| −7.434 | 1.495 | 7.539 |
| −7.683 | 1.645 | 7.539 |
| −7.901 | 1.784 | 7.539 |
| −8.101 | 1.922 | 7.539 |
| −8.268 | 2.048 | 7.539 |
| −8.392 | 2.151 | 7.539 |
| −8.486 | 2.24 | 7.539 |
| −8.55 | 2.313 | 7.539 |
| −8.591 | 2.373 | 7.539 |
| −8.606 | 2.41 | 7.539 |
| −8.609 | 2.436 | 7.539 |
| −8.607 | 2.449 | 7.539 |
| −8.605 | 2.455 | 7.539 |
| −8.604 | 2.458 | 7.539 |
| −8.602 | 2.46 | 7.539 |
| −8.598 | 2.465 | 7.539 |
| −8.588 | 2.473 | 7.539 |
| −8.564 | 2.48 | 7.539 |
| −8.525 | 2.483 | 7.539 |
| −8.456 | 2.477 | 7.539 |
| −8.364 | 2.458 | 7.539 |
| −8.244 | 2.427 | 7.539 |
| −8.096 | 2.381 | 7.539 |
| −7.905 | 2.315 | 7.539 |
| −7.686 | 2.236 | 7.539 |
| −7.453 | 2.15 | 7.539 |
| −7.191 | 2.054 | 7.539 |
| −6.898 | 1.95 | 7.539 |
| −6.575 | 1.838 | 7.539 |
| −6.236 | 1.725 | 7.539 |
| −5.882 | 1.61 | 7.539 |
| −5.512 | 1.494 | 7.539 |
| −5.127 | 1.376 | 7.539 |
| −4.725 | 1.258 | 7.539 |
| −4.308 | 1.139 | 7.539 |
| −3.875 | 1.021 | 7.539 |
| −3.425 | 0.902 | 7.539 |
| −2.975 | 0.787 | 7.539 |
| −2.524 | 0.675 | 7.539 |
| −2.072 | 0.567 | 7.539 |
| −1.619 | 0.464 | 7.539 |
| −1.164 | 0.367 | 7.539 |
| −0.708 | 0.275 | 7.539 |
| −0.25 | 0.19 | 7.539 |
| 0.209 | 0.11 | 7.539 |
| 0.669 | 0.036 | 7.539 |
| 1.129 | −0.033 | 7.539 |
| 1.591 | −0.096 | 7.539 |
| 2.037 | −0.152 | 7.539 |
| 2.469 | −0.202 | 7.539 |
| 2.886 | −0.246 | 7.539 |
| 3.288 | −0.286 | 7.539 |
| 3.675 | −0.321 | 7.539 |
| 4.046 | −0.351 | 7.539 |
| 4.403 | −0.379 | 7.539 |
| 4.728 | −0.402 | 7.539 |
| 5.022 | −0.422 | 7.539 |
| 5.286 | −0.439 | 7.539 |
| 5.519 | −0.452 | 7.539 |
| 5.72 | −0.464 | 7.539 |
| 5.891 | −0.473 | 7.539 |
| 6.037 | −0.481 | 7.539 |
| 6.159 | −0.488 | 7.539 |
| 6.26 | −0.493 | 7.539 |
| 6.341 | −0.497 | 7.539 |
| 6.401 | −0.507 | 7.539 |
| 6.439 | −0.533 | 7.539 |
| 6.462 | −0.564 | 7.539 |

TABLE 1-continued

| X-LOC | Y-LOC | Z-LOC |
|---|---|---|
| 6.473 | −0.593 | 7.539 |
| 6.318 | −1.546 | 9.94 |
| 6.314 | −1.57 | 9.94 |
| 6.3 | −1.598 | 9.94 |
| 6.272 | −1.626 | 9.94 |
| 6.227 | −1.64 | 9.94 |
| 6.164 | −1.638 | 9.94 |
| 6.082 | −1.635 | 9.94 |
| 5.979 | −1.631 | 9.94 |
| 5.854 | −1.626 | 9.94 |
| 5.706 | −1.62 | 9.94 |
| 5.532 | −1.613 | 9.94 |
| 5.326 | −1.604 | 9.94 |
| 5.089 | −1.593 | 9.94 |
| 4.821 | −1.579 | 9.94 |
| 4.521 | −1.561 | 9.94 |
| 4.189 | −1.54 | 9.94 |
| 3.826 | −1.514 | 9.94 |
| 3.448 | −1.483 | 9.94 |
| 3.055 | −1.446 | 9.94 |
| 2.647 | −1.403 | 9.94 |
| 2.225 | −1.353 | 9.94 |
| 1.788 | −1.294 | 9.94 |
| 1.338 | −1.227 | 9.94 |
| 0.874 | −1.149 | 9.94 |
| 0.412 | −1.063 | 9.94 |
| −0.048 | −0.969 | 9.94 |
| −0.507 | −0.866 | 9.94 |
| −0.963 | −0.755 | 9.94 |
| −1.418 | −0.636 | 9.94 |
| −1.871 | −0.509 | 9.94 |
| −2.322 | −0.375 | 9.94 |
| −2.771 | −0.233 | 9.94 |
| −3.218 | −0.081 | 9.94 |
| −3.662 | 0.081 | 9.94 |
| −4.105 | 0.252 | 9.94 |
| −4.53 | 0.426 | 9.94 |
| −4.938 | 0.602 | 9.94 |
| −5.328 | 0.778 | 9.94 |
| −5.7 | 0.955 | 9.94 |
| −6.056 | 1.129 | 9.94 |
| −6.395 | 1.303 | 9.94 |
| −6.717 | 1.474 | 9.94 |
| −7.023 | 1.642 | 9.94 |
| −7.298 | 1.8 | 9.94 |
| −7.542 | 1.948 | 9.94 |
| −7.755 | 2.085 | 9.94 |
| −7.951 | 2.221 | 9.94 |
| −8.116 | 2.345 | 9.94 |
| −8.238 | 2.446 | 9.94 |
| −8.33 | 2.533 | 9.94 |
| −8.394 | 2.603 | 9.94 |
| −8.436 | 2.661 | 9.94 |
| −8.453 | 2.697 | 9.94 |
| −8.457 | 2.722 | 9.94 |
| −8.456 | 2.735 | 9.94 |
| −8.453 | 2.741 | 9.94 |
| −8.452 | 2.744 | 9.94 |
| −8.45 | 2.746 | 9.94 |
| −8.446 | 2.751 | 9.94 |
| −8.435 | 2.756 | 9.94 |
| −8.41 | 2.761 | 9.94 |
| −8.371 | 2.759 | 9.94 |
| −8.303 | 2.746 | 9.94 |
| −8.213 | 2.721 | 9.94 |
| −8.096 | 2.682 | 9.94 |
| −7.951 | 2.628 | 9.94 |
| −7.764 | 2.553 | 9.94 |
| −7.55 | 2.464 | 9.94 |
| −7.322 | 2.368 | 9.94 |
| −7.064 | 2.263 | 9.94 |
| −6.776 | 2.149 | 9.94 |
| −6.458 | 2.028 | 9.94 |
| −6.124 | 1.904 | 9.94 |
| −5.775 | 1.778 | 9.94 |
| −5.41 | 1.651 | 9.94 |
| −5.03 | 1.52 | 9.94 |

TABLE 1-continued

| X-LOC | Y-LOC | Z-LOC |
|---|---|---|
| −4.635 | 1.387 | 9.94 |
| −4.224 | 1.251 | 9.94 |
| −3.797 | 1.113 | 9.94 |
| −3.355 | 0.972 | 9.94 |
| −2.913 | 0.832 | 9.94 |
| −2.471 | 0.692 | 9.94 |
| −2.028 | 0.554 | 9.94 |
| −1.585 | 0.418 | 9.94 |
| −1.141 | 0.284 | 9.94 |
| −0.696 | 0.153 | 9.94 |
| −0.25 | 0.025 | 9.94 |
| 0.197 | −0.099 | 9.94 |
| 0.644 | −0.219 | 9.94 |
| 1.093 | −0.336 | 9.94 |
| 1.543 | −0.448 | 9.94 |
| 1.979 | −0.553 | 9.94 |
| 2.401 | −0.652 | 9.94 |
| 2.808 | −0.744 | 9.94 |
| 3.2 | −0.831 | 9.94 |
| 3.578 | −0.912 | 9.94 |
| 3.942 | −0.988 | 9.94 |
| 4.29 | −1.059 | 9.94 |
| 4.609 | −1.123 | 9.94 |
| 4.897 | −1.18 | 9.94 |
| 5.155 | −1.23 | 9.94 |
| 5.383 | −1.274 | 9.94 |
| 5.58 | −1.311 | 9.94 |
| 5.747 | −1.343 | 9.94 |
| 5.89 | −1.37 | 9.94 |
| 6.01 | −1.392 | 9.94 |
| 6.109 | −1.41 | 9.94 |
| 6.188 | −1.425 | 9.94 |
| 6.249 | −1.437 | 9.94 |
| 6.287 | −1.462 | 9.94 |
| 6.308 | −1.494 | 9.94 |
| 6.317 | −1.523 | 9.94 |
| 6.129 | −2.373 | 12.34 |
| 6.122 | −2.396 | 12.34 |
| 6.104 | −2.422 | 12.34 |
| 6.071 | −2.442 | 12.34 |
| 6.024 | −2.443 | 12.34 |
| 5.963 | −2.433 | 12.34 |
| 5.882 | −2.421 | 12.34 |
| 5.782 | −2.405 | 12.34 |
| 5.66 | −2.387 | 12.34 |
| 5.515 | −2.365 | 12.34 |
| 5.345 | −2.338 | 12.34 |
| 5.144 | −2.307 | 12.34 |
| 4.913 | −2.269 | 12.34 |
| 4.651 | −2.224 | 12.34 |
| 4.359 | −2.173 | 12.34 |
| 4.036 | −2.113 | 12.34 |
| 3.684 | −2.046 | 12.34 |
| 3.317 | −1.973 | 12.34 |
| 2.935 | −1.892 | 12.34 |
| 2.54 | −1.804 | 12.34 |
| 2.13 | −1.708 | 12.34 |
| 1.707 | −1.602 | 12.34 |
| 1.27 | −1.488 | 12.34 |
| 0.82 | −1.363 | 12.34 |
| 0.371 | −1.231 | 12.34 |
| −0.075 | −1.092 | 12.34 |
| −0.52 | −0.947 | 12.34 |
| −0.963 | −0.795 | 12.34 |
| −1.404 | −0.636 | 12.34 |
| −1.843 | −0.471 | 12.34 |
| −2.279 | −0.3 | 12.34 |
| −2.713 | −0.123 | 12.34 |
| −3.145 | 0.06 | 12.34 |
| −3.574 | 0.249 | 12.34 |
| −4 | 0.444 | 12.34 |
| −4.411 | 0.636 | 12.34 |
| −4.805 | 0.826 | 12.34 |
| −5.184 | 1.013 | 12.34 |
| −5.546 | 1.196 | 12.34 |
| −5.894 | 1.375 | 12.34 |
| −6.225 | 1.551 | 12.34 |

TABLE 1-continued

| X-LOC | Y-LOC | Z-LOC |
|---|---|---|
| −6.541 | 1.723 | 12.34 |
| −6.841 | 1.891 | 12.34 |
| −7.111 | 2.048 | 12.34 |
| −7.351 | 2.196 | 12.34 |
| −7.56 | 2.332 | 12.34 |
| −7.752 | 2.467 | 12.34 |
| −7.913 | 2.591 | 12.34 |
| −8.033 | 2.692 | 12.34 |
| −8.123 | 2.779 | 12.34 |
| −8.186 | 2.848 | 12.34 |
| −8.228 | 2.905 | 12.34 |
| −8.245 | 2.94 | 12.34 |
| −8.25 | 2.965 | 12.34 |
| −8.248 | 2.977 | 12.34 |
| −8.246 | 2.983 | 12.34 |
| −8.245 | 2.986 | 12.34 |
| −8.243 | 2.988 | 12.34 |
| −8.238 | 2.992 | 12.34 |
| −8.226 | 2.996 | 12.34 |
| −8.202 | 2.997 | 12.34 |
| −8.163 | 2.992 | 12.34 |
| −8.096 | 2.974 | 12.34 |
| −8.009 | 2.943 | 12.34 |
| −7.895 | 2.898 | 12.34 |
| −7.753 | 2.837 | 12.34 |
| −7.571 | 2.754 | 12.34 |
| −7.361 | 2.658 | 12.34 |
| −7.136 | 2.556 | 12.34 |
| −6.883 | 2.445 | 12.34 |
| −6.599 | 2.325 | 12.34 |
| −6.285 | 2.198 | 12.34 |
| −5.956 | 2.067 | 12.34 |
| −5.612 | 1.933 | 12.34 |
| −5.253 | 1.795 | 12.34 |
| −4.879 | 1.651 | 12.34 |
| −4.491 | 1.502 | 12.34 |
| −4.089 | 1.347 | 12.34 |
| −3.673 | 1.186 | 12.34 |
| −3.242 | 1.019 | 12.34 |
| −2.812 | 0.851 | 12.34 |
| −2.382 | 0.683 | 12.34 |
| −1.952 | 0.514 | 12.34 |
| −1.522 | 0.345 | 12.34 |
| −1.092 | 0.177 | 12.34 |
| −0.661 | 0.011 | 12.34 |
| −0.23 | −0.153 | 12.34 |
| 0.203 | −0.314 | 12.34 |
| 0.637 | −0.473 | 12.34 |
| 1.071 | −0.63 | 12.34 |
| 1.506 | −0.785 | 12.34 |
| 1.928 | −0.932 | 12.34 |
| 2.335 | −1.073 | 12.34 |
| 2.729 | −1.207 | 12.34 |
| 3.108 | −1.334 | 12.34 |
| 3.474 | −1.455 | 12.34 |
| 3.825 | −1.569 | 12.34 |
| 4.162 | −1.678 | 12.34 |
| 4.47 | −1.776 | 12.34 |
| 4.749 | −1.864 | 12.34 |
| 4.999 | −1.942 | 12.34 |
| 5.219 | −2.011 | 12.34 |
| 5.41 | −2.071 | 12.34 |
| 5.572 | −2.121 | 12.34 |
| 5.711 | −2.163 | 12.34 |
| 5.827 | −2.198 | 12.34 |
| 5.923 | −2.226 | 12.34 |
| 6 | −2.249 | 12.34 |
| 6.059 | −2.266 | 12.34 |
| 6.1 | −2.288 | 12.34 |
| 6.122 | −2.32 | 12.34 |
| 6.13 | −2.35 | 12.34 |
| 5.887 | −3.047 | 14.74 |
| 5.878 | −3.068 | 14.74 |
| 5.857 | −3.091 | 14.74 |
| 5.821 | −3.103 | 14.74 |
| 5.775 | −3.096 | 14.74 |
| 5.715 | −3.083 | 14.74 |

TABLE 1-continued

| X-LOC | Y-LOC | Z-LOC |
|---|---|---|
| 5.636 | −3.065 | 14.74 |
| 5.538 | −3.042 | 14.74 |
| 5.419 | −3.014 | 14.74 |
| 5.278 | −2.979 | 14.74 |
| 5.112 | −2.938 | 14.74 |
| 4.917 | −2.889 | 14.74 |
| 4.692 | −2.831 | 14.74 |
| 4.438 | −2.764 | 14.74 |
| 4.154 | −2.686 | 14.74 |
| 3.841 | −2.598 | 14.74 |
| 3.5 | −2.498 | 14.74 |
| 3.144 | −2.391 | 14.74 |
| 2.776 | −2.276 | 14.74 |
| 2.393 | −2.152 | 14.74 |
| 1.998 | −2.019 | 14.74 |
| 1.59 | −1.876 | 14.74 |
| 1.17 | −1.722 | 14.74 |
| 0.736 | −1.559 | 14.74 |
| 0.305 | −1.39 | 14.74 |
| −0.125 | −1.216 | 14.74 |
| −0.553 | −1.038 | 14.74 |
| −0.979 | −0.854 | 14.74 |
| −1.403 | −0.665 | 14.74 |
| −1.825 | −0.472 | 14.74 |
| −2.245 | −0.274 | 14.74 |
| −2.663 | −0.071 | 14.74 |
| −3.078 | 0.136 | 14.74 |
| −3.492 | 0.347 | 14.74 |
| −3.904 | 0.561 | 14.74 |
| −4.3 | 0.771 | 14.74 |
| −4.682 | 0.977 | 14.74 |
| −5.048 | 1.177 | 14.74 |
| −5.4 | 1.373 | 14.74 |
| −5.737 | 1.563 | 14.74 |
| −6.058 | 1.749 | 14.74 |
| −6.365 | 1.93 | 14.74 |
| −6.656 | 2.107 | 14.74 |
| −6.919 | 2.271 | 14.74 |
| −7.152 | 2.423 | 14.74 |
| −7.356 | 2.564 | 14.74 |
| −7.542 | 2.702 | 14.74 |
| −7.699 | 2.828 | 14.74 |
| −7.815 | 2.93 | 14.74 |
| −7.904 | 3.017 | 14.74 |
| −7.966 | 3.086 | 14.74 |
| −8.007 | 3.143 | 14.74 |
| −8.024 | 3.177 | 14.74 |
| −8.03 | 3.201 | 14.74 |
| −8.029 | 3.213 | 14.74 |
| −8.027 | 3.219 | 14.74 |
| −8.026 | 3.222 | 14.74 |
| −8.024 | 3.224 | 14.74 |
| −8.018 | 3.228 | 14.74 |
| −8.006 | 3.231 | 14.74 |
| −7.982 | 3.229 | 14.74 |
| −7.944 | 3.22 | 14.74 |
| −7.879 | 3.198 | 14.74 |
| −7.795 | 3.163 | 14.74 |
| −7.683 | 3.111 | 14.74 |
| −7.546 | 3.044 | 14.74 |
| −7.368 | 2.954 | 14.74 |
| −7.164 | 2.849 | 14.74 |
| −6.945 | 2.74 | 14.74 |
| −6.697 | 2.62 | 14.74 |
| −6.419 | 2.49 | 14.74 |
| −6.112 | 2.351 | 14.74 |
| −5.791 | 2.209 | 14.74 |
| −5.454 | 2.062 | 14.74 |
| −5.103 | 1.91 | 14.74 |
| −4.738 | 1.751 | 14.74 |
| −4.359 | 1.587 | 14.74 |
| −3.966 | 1.415 | 14.74 |
| −3.56 | 1.236 | 14.74 |
| −3.141 | 1.049 | 14.74 |
| −2.723 | 0.86 | 14.74 |
| −2.305 | 0.67 | 14.74 |
| −1.887 | 0.478 | 14.74 |

TABLE 1-continued

| X-LOC | Y-LOC | Z-LOC |
|---|---|---|
| −1.471 | 0.286 | 14.74 |
| −1.054 | 0.093 | 14.74 |
| −0.637 | −0.099 | 14.74 |
| −0.22 | −0.292 | 14.74 |
| 0.197 | −0.483 | 14.74 |
| 0.614 | −0.674 | 14.74 |
| 1.032 | −0.865 | 14.74 |
| 1.45 | −1.055 | 14.74 |
| 1.854 | −1.238 | 14.74 |
| 2.245 | −1.414 | 14.74 |
| 2.622 | −1.582 | 14.74 |
| 2.986 | −1.743 | 14.74 |
| 3.337 | −1.897 | 14.74 |
| 3.673 | −2.043 | 14.74 |
| 3.996 | −2.183 | 14.74 |
| 4.292 | −2.309 | 14.74 |
| 4.56 | −2.423 | 14.74 |
| 4.799 | −2.524 | 14.74 |
| 5.011 | −2.613 | 14.74 |
| 5.195 | −2.688 | 14.74 |
| 5.351 | −2.752 | 14.74 |
| 5.484 | −2.806 | 14.74 |
| 5.596 | −2.851 | 14.74 |
| 5.688 | −2.889 | 14.74 |
| 5.762 | −2.919 | 14.74 |
| 5.819 | −2.942 | 14.74 |
| 5.86 | −2.963 | 14.74 |
| 5.883 | −2.994 | 14.74 |
| 5.89 | −3.024 | 14.74 |
| 5.605 | −3.581 | 17.14 |
| 5.594 | −3.601 | 17.14 |
| 5.57 | −3.62 | 17.14 |
| 5.532 | −3.622 | 17.14 |
| 5.487 | −3.609 | 17.14 |
| 5.428 | −3.592 | 17.14 |
| 5.352 | −3.569 | 17.14 |
| 5.256 | −3.54 | 17.14 |
| 5.14 | −3.504 | 17.14 |
| 5.003 | −3.46 | 17.14 |
| 4.842 | −3.407 | 17.14 |
| 4.652 | −3.344 | 17.14 |
| 4.434 | −3.271 | 17.14 |
| 4.187 | −3.186 | 17.14 |
| 3.911 | −3.089 | 17.14 |
| 3.608 | −2.979 | 17.14 |
| 3.278 | −2.855 | 17.14 |
| 2.934 | −2.722 | 17.14 |
| 2.578 | −2.579 | 17.14 |
| 2.21 | −2.426 | 17.14 |
| 1.83 | −2.263 | 17.14 |
| 1.438 | −2.087 | 17.14 |
| 1.035 | −1.898 | 17.14 |
| 0.62 | −1.698 | 17.14 |
| 0.208 | −1.492 | 17.14 |
| −0.203 | −1.282 | 17.14 |
| −0.612 | −1.069 | 17.14 |
| −1.019 | −0.854 | 17.14 |
| −1.424 | −0.635 | 17.14 |
| −1.828 | −0.414 | 17.14 |
| −2.231 | −0.189 | 17.14 |
| −2.632 | 0.038 | 17.14 |
| −3.031 | 0.268 | 17.14 |
| −3.43 | 0.5 | 17.14 |
| −3.827 | 0.734 | 17.14 |
| −4.209 | 0.962 | 17.14 |
| −4.577 | 1.185 | 17.14 |
| −4.931 | 1.402 | 17.14 |
| −5.271 | 1.612 | 17.14 |
| −5.596 | 1.817 | 17.14 |
| −5.906 | 2.016 | 17.14 |
| −6.202 | 2.21 | 17.14 |
| −6.482 | 2.398 | 17.14 |
| −6.735 | 2.573 | 17.14 |
| −6.96 | 2.734 | 17.14 |
| −7.157 | 2.881 | 17.14 |
| −7.337 | 3.025 | 17.14 |
| −7.489 | 3.154 | 17.14 |

TABLE 1-continued

| X-LOC | Y-LOC | Z-LOC |
|---|---|---|
| −7.602 | 3.258 | 17.14 |
| −7.689 | 3.346 | 17.14 |
| −7.75 | 3.415 | 17.14 |
| −7.79 | 3.471 | 17.14 |
| −7.809 | 3.505 | 17.14 |
| −7.816 | 3.528 | 17.14 |
| −7.816 | 3.541 | 17.14 |
| −7.814 | 3.546 | 17.14 |
| −7.812 | 3.549 | 17.14 |
| −7.81 | 3.551 | 17.14 |
| −7.804 | 3.554 | 17.14 |
| −7.792 | 3.556 | 17.14 |
| −7.768 | 3.552 | 17.14 |
| −7.732 | 3.54 | 17.14 |
| −7.668 | 3.514 | 17.14 |
| −7.586 | 3.474 | 17.14 |
| −7.478 | 3.417 | 17.14 |
| −7.345 | 3.343 | 17.14 |
| −7.173 | 3.245 | 17.14 |
| −6.974 | 3.132 | 17.14 |
| −6.76 | 3.014 | 17.14 |
| −6.518 | 2.884 | 17.14 |
| −6.248 | 2.744 | 17.14 |
| −5.949 | 2.593 | 17.14 |
| −5.635 | 2.438 | 17.14 |
| −5.306 | 2.277 | 17.14 |
| −4.964 | 2.111 | 17.14 |
| −4.607 | 1.938 | 17.14 |
| −4.237 | 1.758 | 17.14 |
| −3.855 | 1.57 | 17.14 |
| −3.459 | 1.373 | 17.14 |
| −3.051 | 1.168 | 17.14 |
| −2.644 | 0.959 | 17.14 |
| −2.239 | 0.748 | 17.14 |
| −1.835 | 0.534 | 17.14 |
| −1.433 | 0.317 | 17.14 |
| −1.032 | 0.098 | 17.14 |
| −0.632 | −0.123 | 17.14 |
| −0.233 | −0.345 | 17.14 |
| 0.165 | −0.57 | 17.14 |
| 0.563 | −0.795 | 17.14 |
| 0.96 | −1.021 | 17.14 |
| 1.357 | −1.247 | 17.14 |
| 1.742 | −1.464 | 17.14 |
| 2.114 | −1.672 | 17.14 |
| 2.475 | −1.871 | 17.14 |
| 2.822 | −2.06 | 17.14 |
| 3.157 | −2.242 | 17.14 |
| 3.479 | −2.415 | 17.14 |
| 3.788 | −2.58 | 17.14 |
| 4.071 | −2.729 | 17.14 |
| 4.327 | −2.864 | 17.14 |
| 4.557 | −2.984 | 17.14 |
| 4.76 | −3.088 | 17.14 |
| 4.936 | −3.178 | 17.14 |
| 5.086 | −3.253 | 17.14 |
| 5.214 | −3.317 | 17.14 |
| 5.322 | −3.371 | 17.14 |
| 5.41 | −3.416 | 17.14 |
| 5.481 | −3.452 | 17.14 |
| 5.535 | −3.479 | 17.14 |
| 5.576 | −3.5 | 17.14 |
| 5.601 | −3.528 | 17.14 |
| 5.608 | −3.558 | 17.14 |
| 5.32 | −4.01 | 19.541 |
| 5.307 | −4.03 | 19.541 |
| 5.278 | −4.041 | 19.541 |
| 5.241 | −4.031 | 19.541 |
| 5.198 | −4.015 | 19.541 |
| 5.14 | −3.994 | 19.541 |
| 5.066 | −3.965 | 19.541 |
| 4.973 | −3.929 | 19.541 |
| 4.86 | −3.885 | 19.541 |
| 4.726 | −3.831 | 19.541 |
| 4.57 | −3.767 | 19.541 |
| 4.385 | −3.691 | 19.541 |
| 4.173 | −3.602 | 19.541 |

TABLE 1-continued

| X-LOC | Y-LOC | Z-LOC |
|---|---|---|
| 3.933 | −3.499 | 19.541 |
| 3.667 | −3.382 | 19.541 |
| 3.373 | −3.249 | 19.541 |
| 3.053 | −3.101 | 19.541 |
| 2.722 | −2.941 | 19.541 |
| 2.379 | −2.771 | 19.541 |
| 2.025 | −2.588 | 19.541 |
| 1.661 | −2.391 | 19.541 |
| 1.286 | −2.181 | 19.541 |
| 0.901 | −1.957 | 19.541 |
| 0.507 | −1.719 | 19.541 |
| 0.115 | −1.477 | 19.541 |
| −0.274 | −1.232 | 19.541 |
| −0.663 | −0.985 | 19.541 |
| −1.052 | −0.738 | 19.541 |
| −1.44 | −0.49 | 19.541 |
| −1.826 | −0.24 | 19.541 |
| −2.212 | 0.011 | 19.541 |
| −2.597 | 0.263 | 19.541 |
| −2.981 | 0.518 | 19.541 |
| −3.364 | 0.773 | 19.541 |
| −3.746 | 1.03 | 19.541 |
| −4.115 | 1.28 | 19.541 |
| −4.469 | 1.523 | 19.541 |
| −4.81 | 1.758 | 19.541 |
| −5.138 | 1.987 | 19.541 |
| −5.451 | 2.208 | 19.541 |
| −5.751 | 2.422 | 19.541 |
| −6.036 | 2.63 | 19.541 |
| −6.307 | 2.831 | 19.541 |
| −6.552 | 3.017 | 19.541 |
| −6.769 | 3.187 | 19.541 |
| −6.96 | 3.342 | 19.541 |
| −7.135 | 3.491 | 19.541 |
| −7.283 | 3.625 | 19.541 |
| −7.393 | 3.732 | 19.541 |
| −7.477 | 3.822 | 19.541 |
| −7.537 | 3.892 | 19.541 |
| −7.577 | 3.948 | 19.541 |
| −7.596 | 3.981 | 19.541 |
| −7.604 | 4.005 | 19.541 |
| −7.604 | 4.017 | 19.541 |
| −7.602 | 4.023 | 19.541 |
| −7.601 | 4.025 | 19.541 |
| −7.598 | 4.027 | 19.541 |
| −7.593 | 4.03 | 19.541 |
| −7.58 | 4.029 | 19.541 |
| −7.557 | 4.023 | 19.541 |
| −7.521 | 4.008 | 19.541 |
| −7.46 | 3.977 | 19.541 |
| −7.381 | 3.932 | 19.541 |
| −7.277 | 3.868 | 19.541 |
| −7.148 | 3.786 | 19.541 |
| −6.981 | 3.679 | 19.541 |
| −6.787 | 3.556 | 19.541 |
| −6.58 | 3.428 | 19.541 |
| −6.344 | 3.287 | 19.541 |
| −6.081 | 3.133 | 19.541 |
| −5.79 | 2.967 | 19.541 |
| −5.484 | 2.795 | 19.541 |
| −5.165 | 2.616 | 19.541 |
| −4.832 | 2.43 | 19.541 |
| −4.486 | 2.237 | 19.541 |
| −4.127 | 2.035 | 19.541 |
| −3.756 | 1.824 | 19.541 |
| −3.373 | 1.602 | 19.541 |
| −2.978 | 1.371 | 19.541 |
| −2.586 | 1.137 | 19.541 |
| −2.195 | 0.899 | 19.541 |
| −1.806 | 0.658 | 19.541 |
| −1.418 | 0.415 | 19.541 |
| −1.033 | 0.167 | 19.541 |
| −0.65 | −0.083 | 19.541 |
| −0.27 | −0.337 | 19.541 |
| 0.109 | −0.594 | 19.541 |
| 0.485 | −0.854 | 19.541 |
| 0.861 | −1.115 | 19.541 |

TABLE 1-continued

| X-LOC | Y-LOC | Z-LOC |
|---|---|---|
| 1.237 | −1.376 | 19.541 |
| 1.602 | −1.627 | 19.541 |
| 1.955 | −1.866 | 19.541 |
| 2.298 | −2.095 | 19.541 |
| 2.629 | −2.312 | 19.541 |
| 2.95 | −2.519 | 19.541 |
| 3.259 | −2.716 | 19.541 |
| 3.556 | −2.902 | 19.541 |
| 3.828 | −3.071 | 19.541 |
| 4.075 | −3.223 | 19.541 |
| 4.296 | −3.358 | 19.541 |
| 4.493 | −3.476 | 19.541 |
| 4.663 | −3.577 | 19.541 |
| 4.808 | −3.662 | 19.541 |
| 4.932 | −3.734 | 19.541 |
| 5.036 | −3.794 | 19.541 |
| 5.122 | −3.843 | 19.541 |
| 5.191 | −3.883 | 19.541 |
| 5.244 | −3.913 | 19.541 |
| 5.284 | −3.936 | 19.541 |
| 5.314 | −3.959 | 19.541 |
| 5.323 | −3.988 | 19.541 |
| 4.963 | −4.287 | 21.941 |
| 4.948 | −4.305 | 21.941 |
| 4.917 | −4.306 | 21.941 |
| 4.882 | −4.291 | 21.941 |
| 4.84 | −4.273 | 21.941 |
| 4.784 | −4.248 | 21.941 |
| 4.711 | −4.215 | 21.941 |
| 4.621 | −4.174 | 21.941 |
| 4.512 | −4.122 | 21.941 |
| 4.382 | −4.059 | 21.941 |
| 4.232 | −3.983 | 21.941 |
| 4.054 | −3.892 | 21.941 |
| 3.85 | −3.786 | 21.941 |
| 3.621 | −3.663 | 21.941 |
| 3.367 | −3.522 | 21.941 |
| 3.088 | −3.363 | 21.941 |
| 2.785 | −3.184 | 21.941 |
| 2.472 | −2.993 | 21.941 |
| 2.149 | −2.789 | 21.941 |
| 1.816 | −2.571 | 21.941 |
| 1.474 | −2.34 | 21.941 |
| 1.123 | −2.093 | 21.941 |
| 0.763 | −1.833 | 21.941 |
| 0.395 | −1.559 | 21.941 |
| 0.029 | −1.282 | 21.941 |
| −0.337 | −1.003 | 21.941 |
| −0.702 | −0.726 | 21.941 |
| −1.069 | −0.449 | 21.941 |
| −1.436 | −0.173 | 21.941 |
| −1.803 | 0.102 | 21.941 |
| −2.172 | 0.377 | 21.941 |
| −2.54 | 0.651 | 21.941 |
| −2.909 | 0.924 | 21.941 |
| −3.277 | 1.198 | 21.941 |
| −3.646 | 1.472 | 21.941 |
| −4.002 | 1.738 | 21.941 |
| −4.345 | 1.995 | 21.941 |
| −4.675 | 2.243 | 21.941 |
| −4.992 | 2.483 | 21.941 |
| −5.296 | 2.716 | 21.941 |
| −5.587 | 2.94 | 21.941 |
| −5.865 | 3.156 | 21.941 |
| −6.129 | 3.366 | 21.941 |
| −6.366 | 3.559 | 21.941 |
| −6.577 | 3.736 | 21.941 |
| −6.763 | 3.896 | 21.941 |
| −6.933 | 4.05 | 21.941 |
| −7.077 | 4.188 | 21.941 |
| −7.184 | 4.297 | 21.941 |
| −7.266 | 4.388 | 21.941 |
| −7.324 | 4.459 | 21.941 |
| −7.364 | 4.515 | 21.941 |
| −7.383 | 4.548 | 21.941 |
| −7.392 | 4.571 | 21.941 |
| −7.393 | 4.583 | 21.941 |

TABLE 1-continued

| X-LOC | Y-LOC | Z-LOC |
|---|---|---|
| −7.392 | 4.589 | 21.941 |
| −7.39 | 4.592 | 21.941 |
| −7.387 | 4.594 | 21.941 |
| −7.381 | 4.595 | 21.941 |
| −7.369 | 4.593 | 21.941 |
| −7.347 | 4.584 | 21.941 |
| −7.313 | 4.566 | 21.941 |
| −7.255 | 4.53 | 21.941 |
| −7.179 | 4.478 | 21.941 |
| −7.08 | 4.407 | 21.941 |
| −6.958 | 4.316 | 21.941 |
| −6.798 | 4.198 | 21.941 |
| −6.613 | 4.064 | 21.941 |
| −6.414 | 3.925 | 21.941 |
| −6.187 | 3.771 | 21.941 |
| −5.932 | 3.603 | 21.941 |
| −5.65 | 3.421 | 21.941 |
| −5.354 | 3.233 | 21.941 |
| −5.045 | 3.038 | 21.941 |
| −4.723 | 2.834 | 21.941 |
| −4.388 | 2.621 | 21.941 |
| −4.042 | 2.399 | 21.941 |
| −3.684 | 2.167 | 21.941 |
| −3.315 | 1.924 | 21.941 |
| −2.935 | 1.669 | 21.941 |
| −2.557 | 1.411 | 21.941 |
| −2.182 | 1.15 | 21.941 |
| −1.81 | 0.884 | 21.941 |
| −1.44 | 0.614 | 21.941 |
| −1.074 | 0.34 | 21.941 |
| −0.711 | 0.062 | 21.941 |
| −0.351 | −0.22 | 21.941 |
| 0.005 | −0.507 | 21.941 |
| 0.359 | −0.797 | 21.941 |
| 0.711 | −1.089 | 21.941 |
| 1.063 | −1.382 | 21.941 |
| 1.405 | −1.663 | 21.941 |
| 1.737 | −1.932 | 21.941 |
| 2.059 | −2.188 | 21.941 |
| 2.372 | −2.432 | 21.941 |
| 2.675 | −2.663 | 21.941 |
| 2.968 | −2.883 | 21.941 |
| 3.251 | −3.091 | 21.941 |
| 3.51 | −3.278 | 21.941 |
| 3.747 | −3.446 | 21.941 |
| 3.96 | −3.594 | 21.941 |
| 4.149 | −3.723 | 21.941 |
| 4.314 | −3.833 | 21.941 |
| 4.454 | −3.925 | 21.941 |
| 4.575 | −4.002 | 21.941 |
| 4.677 | −4.066 | 21.941 |
| 4.761 | −4.119 | 21.941 |
| 4.828 | −4.161 | 21.941 |
| 4.88 | −4.194 | 21.941 |
| 4.919 | −4.218 | 21.941 |
| 4.951 | −4.238 | 21.941 |
| 4.966 | −4.265 | 21.941 |
| 4.552 | −4.468 | 24.341 |
| 4.534 | −4.483 | 24.341 |
| 4.505 | −4.475 | 24.341 |
| 4.469 | −4.459 | 24.341 |
| 4.427 | −4.44 | 24.341 |
| 4.37 | −4.414 | 24.341 |
| 4.297 | −4.38 | 24.341 |
| 4.207 | −4.336 | 24.341 |
| 4.097 | −4.282 | 24.341 |
| 3.968 | −4.214 | 24.341 |
| 3.819 | −4.133 | 24.341 |
| 3.643 | −4.035 | 24.341 |
| 3.443 | −3.918 | 24.341 |
| 3.219 | −3.781 | 24.341 |
| 2.972 | −3.622 | 24.341 |
| 2.703 | −3.439 | 24.341 |
| 2.414 | −3.232 | 24.341 |
| 2.118 | −3.009 | 24.341 |
| 1.815 | −2.77 | 24.341 |
| 1.505 | −2.516 | 24.341 |

TABLE 1-continued

| X-LOC | Y-LOC | Z-LOC |
|---|---|---|
| 1.188 | −2.248 | 24.341 |
| 0.863 | −1.965 | 24.341 |
| 0.53 | −1.667 | 24.341 |
| 0.189 | −1.355 | 24.341 |
| −0.149 | −1.041 | 24.341 |
| −0.486 | −0.724 | 24.341 |
| −0.822 | −0.407 | 24.341 |
| −1.158 | −0.09 | 24.341 |
| −1.495 | 0.227 | 24.341 |
| −1.832 | 0.542 | 24.341 |
| −2.171 | 0.856 | 24.341 |
| −2.512 | 1.168 | 24.341 |
| −2.854 | 1.479 | 24.341 |
| −3.197 | 1.788 | 24.341 |
| −3.541 | 2.096 | 24.341 |
| −3.875 | 2.393 | 24.341 |
| −4.198 | 2.678 | 24.341 |
| −4.51 | 2.953 | 24.341 |
| −4.811 | 3.217 | 24.341 |
| −5.099 | 3.471 | 24.341 |
| −5.376 | 3.716 | 24.341 |
| −5.64 | 3.952 | 24.341 |
| −5.89 | 4.181 | 24.341 |
| −6.114 | 4.392 | 24.341 |
| −6.312 | 4.586 | 24.341 |
| −6.485 | 4.761 | 24.341 |
| −6.644 | 4.929 | 24.341 |
| −6.776 | 5.079 | 24.341 |
| −6.874 | 5.198 | 24.341 |
| −6.949 | 5.296 | 24.341 |
| −7.001 | 5.372 | 24.341 |
| −7.037 | 5.432 | 24.341 |
| −7.054 | 5.466 | 24.341 |
| −7.062 | 5.489 | 24.341 |
| −7.063 | 5.502 | 24.341 |
| −7.062 | 5.508 | 24.341 |
| −7.06 | 5.51 | 24.341 |
| −7.058 | 5.512 | 24.341 |
| −7.051 | 5.511 | 24.341 |
| −7.04 | 5.507 | 24.341 |
| −7.019 | 5.494 | 24.341 |
| −6.989 | 5.471 | 24.341 |
| −6.936 | 5.426 | 24.341 |
| −6.868 | 5.364 | 24.341 |
| −6.779 | 5.279 | 24.341 |
| −6.669 | 5.172 | 24.341 |
| −6.524 | 5.035 | 24.341 |
| −6.354 | 4.879 | 24.341 |
| −6.17 | 4.717 | 24.341 |
| −5.959 | 4.539 | 24.341 |
| −5.722 | 4.344 | 24.341 |
| −5.458 | 4.134 | 24.341 |
| −5.18 | 3.916 | 24.341 |
| −4.89 | 3.69 | 24.341 |
| −4.588 | 3.453 | 24.341 |
| −4.275 | 3.206 | 24.341 |
| −3.951 | 2.948 | 24.341 |
| −3.618 | 2.677 | 24.341 |
| −3.275 | 2.394 | 24.341 |
| −2.923 | 2.098 | 24.341 |
| −2.574 | 1.799 | 24.341 |
| −2.228 | 1.496 | 24.341 |
| −1.885 | 1.189 | 24.341 |
| −1.545 | 0.879 | 24.341 |
| −1.208 | 0.566 | 24.341 |
| −0.874 | 0.25 | 24.341 |
| −0.541 | −0.068 | 24.341 |
| −0.21 | −0.388 | 24.341 |
| 0.12 | −0.71 | 24.341 |
| 0.45 | −1.032 | 24.341 |
| 0.78 | −1.353 | 24.341 |
| 1.1 | −1.661 | 24.341 |
| 1.412 | −1.958 | 24.341 |
| 1.714 | −2.241 | 24.341 |
| 2.009 | −2.511 | 24.341 |
| 2.294 | −2.767 | 24.341 |
| 2.573 | −3.008 | 24.341 |
| 2.844 | −3.234 | 24.341 |
| 3.095 | −3.436 | 24.341 |
| 3.327 | −3.614 | 24.341 |
| 3.537 | −3.769 | 24.341 |
| 3.724 | −3.903 | 24.341 |
| 3.888 | −4.017 | 24.341 |
| 4.028 | −4.111 | 24.341 |
| 4.15 | −4.189 | 24.341 |
| 4.252 | −4.254 | 24.341 |
| 4.337 | −4.307 | 24.341 |
| 4.405 | −4.349 | 24.341 |
| 4.457 | −4.381 | 24.341 |
| 4.497 | −4.405 | 24.341 |
| 4.529 | −4.425 | 24.341 |
| 4.552 | −4.445 | 24.341 |

It will also be appreciated that the exemplary airfoil(s) disclosed in the above Table may be scaled up or down geometrically for use in other similar compressor designs. Consequently, the coordinate values set forth in the Table may be scaled upwardly or downwardly such that the airfoil profile shape remains unchanged. A scaled version of the coordinates in Table would be represented by X, Y and Z coordinate values of Table multiplied or divided by a constant.

While various embodiments are described herein, it will be appreciated from the specification that various combinations of elements, variations or improvements therein may be made by those skilled in the art, and are within the scope of the invention.

What is claimed is:

1. An article of manufacture, the article having a nominal profile substantially in accordance with Cartesian coordinate values of X, Y and Z set forth in a TABLE 1, and wherein X and Y are distances in inches which, when connected by smooth continuing arcs, define airfoil profile sections at each distance Z in inches, the profile sections at the Z distances being joined smoothly with one another to form a complete airfoil shape.

2. An article of manufacture according to claim 1, wherein the article comprises an airfoil.

3. An article of manufacture according to claim 2, wherein said article shape lies in an envelope within ±0.160 inches in a direction normal to any article surface location.

4. An article of manufacture according to claim 1, wherein the article comprises a rotor.

5. A compressor comprising a compressor wheel having a plurality of articles of manufacture, each of said articles of manufacture including an airfoil having an airfoil shape, said airfoil having a nominal profile substantially in accordance with Cartesian coordinate values of X, Y and Z set forth in a TABLE 1, wherein X and Y are distances in inches which, when connected by smooth continuing arcs, define the airfoil profile sections at each distance Z in inches, the profile sections at the Z distances being joined smoothly with one another to form a complete airfoil shape.

6. A compressor according to claim 5, wherein the article of manufacture comprises a rotor.

7. A compressor comprising a compressor wheel having a plurality of articles of manufacture, each of said articles of manufacture including an airfoil having an uncoated nominal airfoil profile substantially in accordance with Cartesian coordinate values of X, Y and Z set forth in a TABLE 1, wherein X and Y are distances in inches which, when connected by smooth continuing arcs, define airfoil profile sections at each distance Z in inches, the profile sections at the Z distances being joined smoothly with one another to form a complete airfoil shape, the X and Y distances being scalable as a function of the same constant or number to provide a scaled-up or scaled-down rotor blade airfoil.

8. A compressor according to claim 7, wherein the article of manufacture comprises a rotor.

9. A compressor according to claim 7 wherein said airfoil shape lies in an envelope within ±0.160 inches in a direction normal to any airfoil surface location.

* * * * *